United States Patent [19]

Pence, IV

[11] Patent Number: 5,188,286

[45] Date of Patent: Feb. 23, 1993

[54] THERMOELECTRIC PIEZOELECTRIC TEMPERATURE CONTROL

[75] Inventor: William E. Pence, IV, Tarrytown, N.Y.

[73] Assignee: International Business Machines Corporation, Armonk, N.Y.

[21] Appl. No.: 809,351

[22] Filed: Dec. 18, 1991

[51] Int. Cl.⁵ .................................................. G05D 23/00
[52] U.S. Cl. ...................................... 236/1 F; 62/3.2; 374/178; 374/45; 257/712
[58] Field of Search .................. 62/3.1, 3.2, 3.3, 3.7; 374/45, 178; 361/381; 236/1 F; 323/907; 357/81

[56] References Cited

U.S. PATENT DOCUMENTS

| | | | |
|---|---|---|---|
| 3,111,008 | 11/1963 | Nelson | 62/3.3 |
| 3,355,666 | 11/1967 | Vought et al. | 62/3.3 |
| 4,223,264 | 9/1980 | Yamamura et al. | 324/95 |
| 4,253,515 | 3/1981 | Swiatosz | 165/61 |
| 4,629,333 | 12/1986 | Dosoretz et al. | 374/20 |
| 4,631,728 | 12/1986 | Simons | 372/38 |
| 4,639,883 | 1/1987 | Michaelis | 364/557 |
| 4,802,178 | 1/1989 | Ury | 372/36 |
| 4,848,090 | 7/1989 | Peters | 62/3.3 |
| 4,912,600 | 3/1990 | Jaeger et al. | 361/385 |
| 4,935,864 | 6/1990 | Schmidt et al. | 363/141 |
| 5,012,325 | 4/1991 | Mansuria et al. | 357/81 |

OTHER PUBLICATIONS

Norton, H. N., "Handbook of Transducers For Electronic Measuring Systems", 1969, Prentice-Hall, pp. 19, 98-105, 264, 265, 436-438.

*Primary Examiner*—John Sollecito
*Attorney, Agent, or Firm*—Daniel P. Morris; Alvin J. Riddles

[57] ABSTRACT

A heat control and interface stress control principle for a material in which a piezoelectric member is positioned in contact with an interface of the material so that a heat generated expansion of the material generates a piezoelectric signal that controls a thermoelectric cooler in contact with the piezoelectric member.

12 Claims, 2 Drawing Sheets

THERMOELECTRIC PIEZOELECTRIC TEMPERATURE CONTROL

TECHNICAL FIELD

The invention relates generally to close control of heat at an interface of a material.

BACKGROUND OF THE INVENTION

Progress in technology has led to structures wherein there is a body of material in which very close regulation of heat is essential, yet physical sizes and interrelationships with other parts of the application where the structure is used, may limit control capability.

One example of an application of such a structure would be a bimetallic planar member used as a precise temperature sensor, where the physical displacement of the member, as it changes shape in response to temperature, is calibrated with respect to a scale, and thus a close control of the temperature of the member at the point from which the calibrated motion is to depart would be essential.

Another example of such a structure would be a planar integrated semiconductor circuit where the overall temperature variation from the power dissipation from the devices therein must not only be transferred to the ambient within narrow temperature variation limits but across the heat dissipating interface there can be regions of higher heat concentration than others caused by different circuitry performing different power consuming functions than others. Close heat transfer control in this type of application has now become a most serious consideration. Thermoelectric coolers have been used quite extensively to assist in heat transfer in downsized and generally inaccessible structures. As examples: in U.S. Pat. No. 4,631,728 the thermoelectric cooler maintains constant the temperature of a laser diode temperature sensor; in U.S. Pat. No. 4,848,090 a thermoelectric cooler is used to control an integrated circuit temperature variation; and in U.S. Pat. No. 4,253,515 different thermoelectric coolers are used at different areas of a planar integrated circuit for different temperature control and moisture control purposes. In each application of a thermoelectric cooler heretofore in the art, the cooler is regulated by a control that is oriented around a reference temperature. Such an arrangement is limited in sensitivity to the quality and sensitivity of the coupling between sensor and thermoelectric cooler.

As continued downsizing and sensitivity progress advances, a need is developing for greater sensitivity in this type of heat control.

SUMMARY OF THE INVENTION

A heat control principle for the interface of a material is provided wherein a piezoelectric member in contact with the interface, in response to a heat produced change in physical dimension of the material, provides a signal that alters the performance of a thermoelectric cooler in contact with the piezoelectric member.

Where the material is a planar member, such as a semiconductor integrated circuit, the piezoelectric member is a layer on the heat radiating surface of the integrated circuit and the signal developed across the piezoelectric member as a result of thermal expansion or contraction in the integrated circuit is used to change the current flow through a thermoelectric cooler in thermal contact with the side of the piezoelectric layer opposite to the side in contact with the integrated circuit.

DESCRIPTION OF THE INVENTION

The expansion of a material produced by heat is employed to produce a stress on a piezoelectric on the material and the resulting signal from the piezoelectric is employed in control of a thermoelectric cooler for the material.

Figure 1:
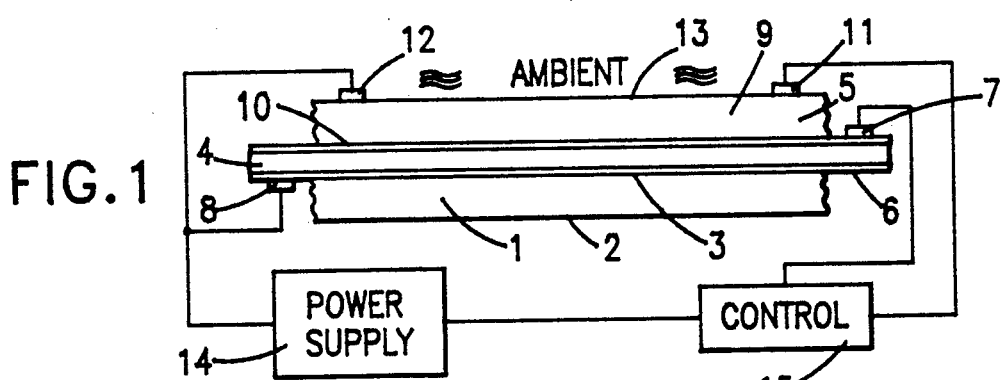
FIG. 1 is a schematic illustration of the thermoelectric piezoelectric temperature control of the invention.

Referring to FIG. 1, there is shown a schematic illustration of the combined electrical and structural relationships in the thermoelectric piezoelectric heat control principle of the invention. In FIG. 1, heat is produced in a member 1, shown with planar shape having two parallel surfaces 2 and 3. The heat in the member 1 may occur from external sources, not shown, or for example from heat dissipation from electronic devices in the surface 3 as would be the case with an integrated circuit where the member 1 would be a semiconductor crystal. The heat is conducted to the ambient through the surface 3. On the surface 3, a layer of piezoelectric material 4 is positioned. The piezoelectric layer 4 has electrical connection means, such as thin metal layers 5 and 6 on each side thereof with electrical connections 7 and 8 thereto. In thermal contact with the layer 7, a thermoelectric cooling member 9 is positioned to transfer the heat to the ambient. The thermoelectric cooling member 9 has a side 10 which becomes cold when current is passed between terminals 11 and 12, shown positioned on the hot side thereof, labelled 13. The hot and cold sides can be reversed by reversing the polarity of the applied power. A power supply 14 provides current to the thermoelectric converter 9 and a signal developed between terminals 7 and 8 of the piezoelectric element 4 is employed in a controller 15 to modify the current between terminals 11 and 12 of the thermoelectric cooler 9.

In accordance with the invention, sensitive heat control is achieved with a piezoelectric member and a thermoelectric cooler in the heat radiation path between the source of the heat and the ambient. With such a structural arrangement, any change in heat at the radiating interface 3 producing an expansion of the material 1 in turn produces a stress on the piezoelectric member 4, generating a signal between terminals 7 and 8. The signal at terminal 7 is applied to controller 15 to modify the current through and thus the cooling ability of the thermoelectric cooler 9. In the structure of the invention, as the heat changes, there is an immediate proportional counter change in the cooling provided by the thermoelectric cooler. Any localized heat change that produces a physical change, usually an expansion anywhere on the radiating area of the interface 3, produces a signal from the piezoelectric element 4 which in turn produces an immediate cooling change from the thermoelectric cooler 9.

The thermoelectric cooler 9 operates on the Peltier principle well known in the art, whereby in essence a current passing through a region where two dissimilar materials are joined produces a reduced temperature at that region. In recent years, an increase in efficiency was found where the dissimilar materials were opposite or n and p conductivity type semiconductor elements.

Figure 2:
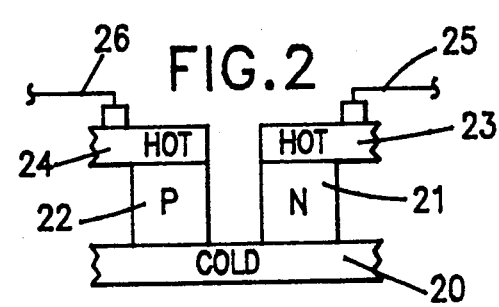
FIG. 2 is a schematic illustration of a portion of a thermoelectric cooling element.

Referring to FIG. 2, a schematic illustration is provided of an example of a unit element of a thermoelectric converter. The example unit element has a cold region 20 at the junction between the n,21 and p,22 semiconductor elements and hot segments 23 and 24. Conductors 25 and 26 are connected to hot segments 23 and 24, respectively, for the supply of current. The unit elements as discussed in FIG. 2 are made up into groups that cover an area.

Thermoelectric coolers are well known in the art and are sometimes referred to as heat pumps. They are available as discrete components. A well known supplier is Marlow Industries, Dallas, Tx. It will be apparent that the thermoelectric cooler structure is adaptable to the planar type deposition and erosion processes employed in the semiconductor industry.

The piezoelectric member 4 is a standard piezoelectric transducer. The performance of such transducers and the materials from which they can be made are described in the Handbook of Transducers for Electronic Measuring Systems by Harry N. Norton, published by Prentice-Hall 1969, on pages 19, 98 to 105, 264, 265 and 436–438.

Figure 3:
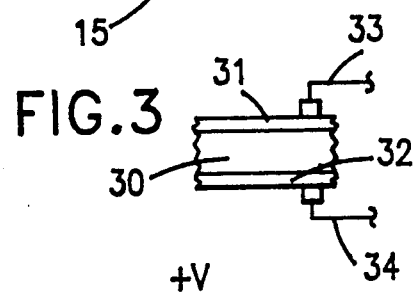
FIG. 3 is a schematic illustration of a piezoelectric element.

An illustrative schematic of a piezoelectric transducer is shown in FIG. 3 wherein a piezoelectric material 30, such as Quartz ($SiO_2$) or Barium Titanate ($BaTiO_3$) as examples, has broad area electrodes 31, 32 of, for example, foil applied over the surfaces with signal electrodes 33 and 34. In operation, a compressive stress between electrodes 31 and 32 on the material 30 produces a voltage signal between the terminals 33 and 34.

The piezoelectric member 4 is available as a discrete device and it will be apparent that the structure is compatible with standard layer deposition techniques.

Figure 4:
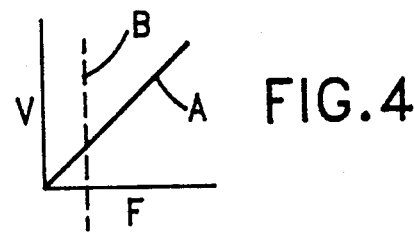
FIG. 4 is a graph of output signal vs. compression force for a piezoelectric element.

The performance with respect to stress of the piezoelectric member is graphically illustrated in FIG. 4. Referring to FIG. 4, the graph illustrates a generally straight line "A" relationship between compressive force F and output voltage V. There is straight line, as illustrated by "A", temperature of operation in the range up to a point known as the "Curie" point, which is several hundred to nearly a thousand degrees C, and which varies with the material used. The material selection should be such that under the operating conditions in use, the Curie point of the piezoelectric material should not be exceeded.

Continuing to refer to FIG. 4, bidirectional signals can be sensed from piezoelectric materials by preloading a compressive force so that a relaxation of the force and an addition to the force both produce signals, one lower than the other. The pre-load compressive force is shown as a dotted line B. Stress force variations on either side of B will produce output voltage signals along A. Preloading compression can be provided by a separate compressive container for the piezoelectric member or by the application of stress between the surfaces 2 and 13. Preloading compression is generally not needed for simple heat sensing since unidirectional signals are sufficient indication. Where semiconductors are involved, compression that is across the semiconductor member should be selected or used with the effect of the compression on the semiconductor taken into consideration.

The invention is particularly useful in accommodating the unique problems encountered in the packaging of electronic assemblies. In such assemblies, the active heat dissipating devices, such as discrete components or integrated circuits in the package, exhibit a thermal gradient in the closely packed contiguous assembly from the active elements to the ambient. The thermal gradient produces an uneven distribution of temperatures within the assembly which causes interfacial stresses to develop as the contiguous parts expand and contract in normal on and off cycling. The interfacial stresses are particularly important in small, frequently used solder joints where they can limit the size of the semiconductor integrated circuit that can be used.

Even in packaging constructions where supporting substrates and integrated circuits are made of the same material with the same thermal coefficient of expansion (TCE), the thermal gradient which is established results in the active device expanding more than the passive supporting substrate, thus producing a situation where there is a finite limit imposed on the size of an interface that can be used without reliability problems.

In accordance with the invention, the thermoelectric piezoelectric structure monitors the stress at an interface and uses the stress information from thermal increments to alter the cooling and thus control the temperature gradient. With the invention capability is present to control interfacial stresses and through such control, designs with a mean time to failure specification, can be achieved.

Figure 6:
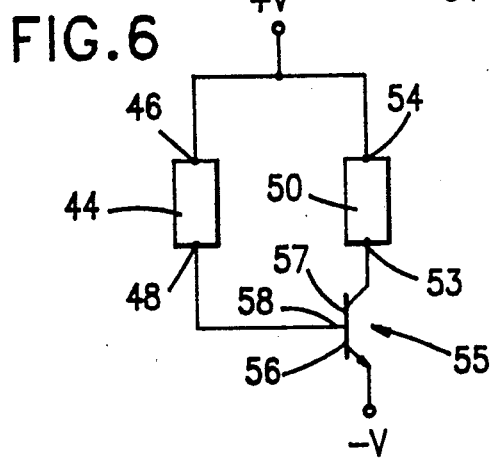
FIG. 6 is a circuit diagram of the interconnections in the application of the invention where the piezoelectric signal controls the current through the thermoelectric cooler.
Figure 5:
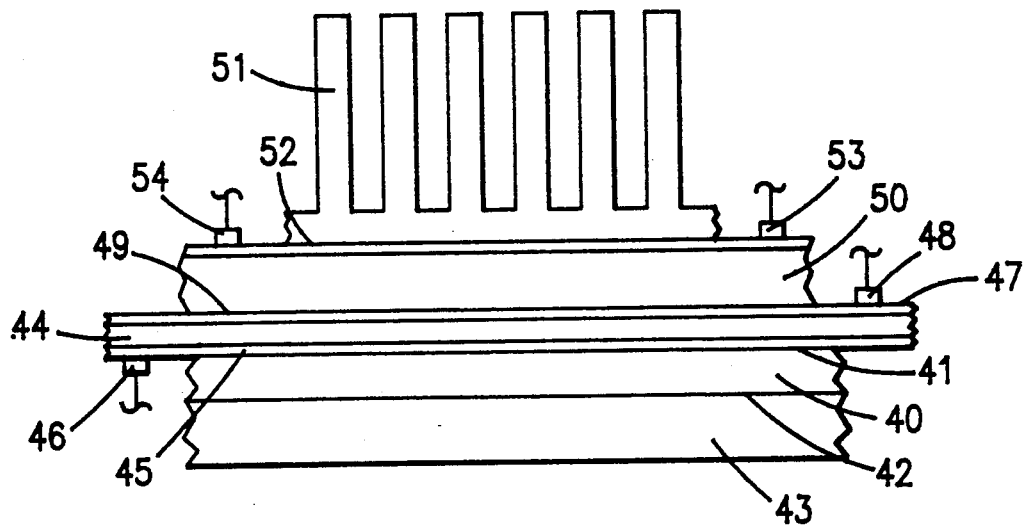
FIG. 5 is an illustration of an integrated circuit packaging structure employing the invention.

Referring to FIGS. 5 and 6, a schematic illustration of an integrated circuit packaging structure and wiring diagram are shown wherein there is an integrated circuit 40 having a high density of active heat producing devices, not shown, in a surface 41. The integrated circuit 40 is supported on a surface 42 by a passive substrate 43. The active devices may produce more heat in some regions of the area of the surface 41 than others and the heat locally and overall may vary and thus interfacial stresses in the package may occur at a thermal transfer interface with surface 41.

In accordance with the invention, a piezoelectric layer 44 is positioned in contact with the integrated circuit surface 41. The piezoelectric layer 44 has a conductive face 45 in contact with the surface 41 with a contact 46 for external signal delivery. The piezoelectric layer 44 has an opposite conductive face 47 with a contact 48 for external signal delivery. On the conductive face 47 of the piezoelectric layer 44, the "cold" side 49 of a thermoelectric cooler 50 is positioned. A cooling fin assembly 51 is positioned on the "hot" side 52 of the thermoelectric cooler. External contacts 53 and 54 are provided on the "hot" side 52 of the thermoelectric cooler for current delivery.

In the accompanying wiring diagram of FIG. 6, a control element 55 having input 56, output 57 and control 58 terminals is connected with the input 56 and output 57 terminals in series with the thermoelectric cooler 50 through terminals 53 and 54 between the +V and −V terminals of the power supply, not shown. The piezoelectric layer 44 is connected through terminals 46 and 48 between +V and the control terminal 58. Since the source impedance of the piezoelectric layer is high, the control element selected is an NPN emitter follower transistor with the control terminal the base thereof.

In operation, any change in heat, overall or localized, produced in the area of the surface 41 results in an expansion of the semiconductor material that in turn produces a stress on the piezoelectric layer 44, producing a voltage signal between terminals 46 and 48. The piezoelectric signal is impressed on the control element 55 resulting in increased current that produces increased cooling in the thermoelectric cooler which operates to increase the dissipation of the heat and to reduce the interfacial stresses forming at the surface 41.

Very close control of interfacial stresses is possible with the invention wherein in a structure there is a comparison between stresses in an active element and a passive element.

Figure 8:
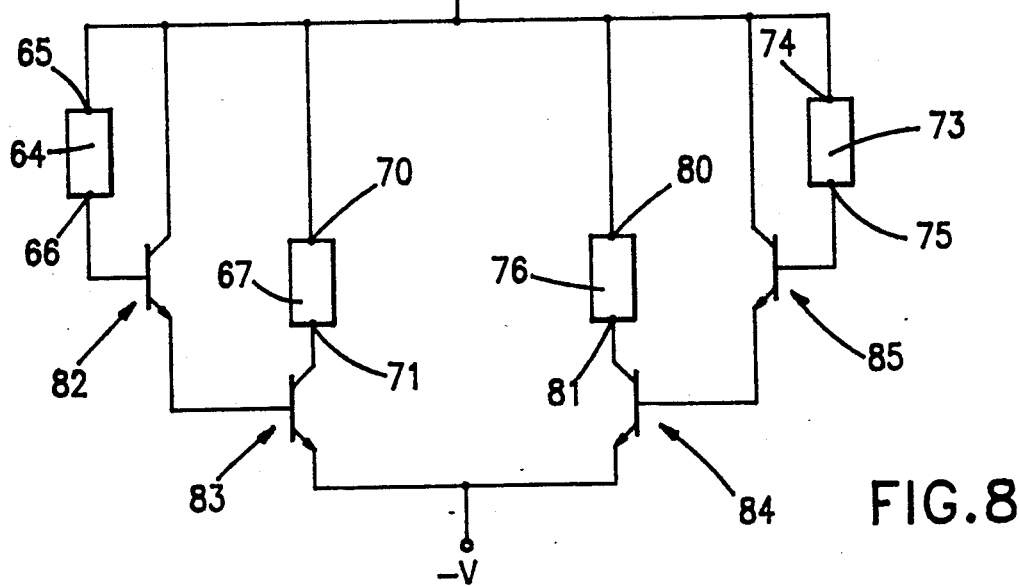
FIG. 8 is a circuit diagram of a high sensitivity heat control where the reference member and the integrated circuit are in branches of a differential amplifier.
Figure 7:
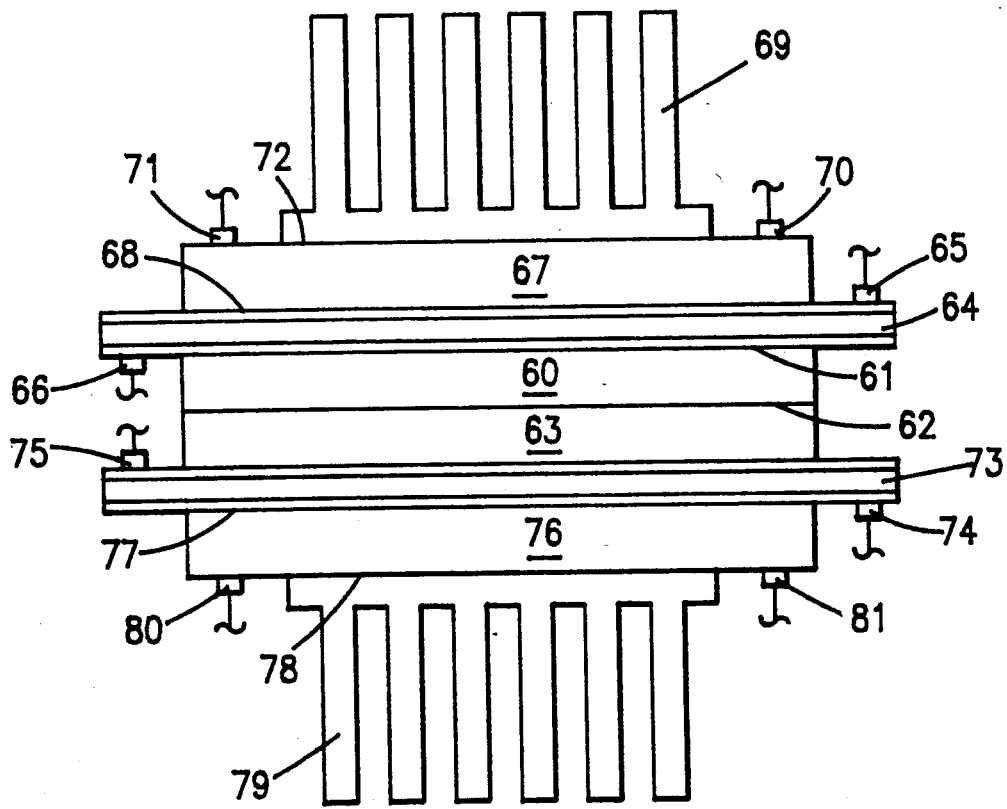
FIG. 7 is an illustration of a control structural principle wherein there is comparison with the thermal performance of a reference member.

Referring to FIGS. 7 and 8, a schematic illustration and corresponding wiring diagram of an integrated circuit and passive substrate thermoelectric piezoelectric heat control packaging system are shown. In FIG. 7, there is an active member 60 with a first thermal coefficient of expansion, such as a semiconductor integrated circuit, having a high density of active heat producing devices that are not shown, in a surface 61. The active member 60 is supported on a surface 62 by a passive substrate 63, with a second and different thermal coefficient of expansion, such as a polysilicon wafer. In operation, heat generated overall or locally in the surface 61 can operate to produce interfacial stresses in the package in thermal transfer between the member 60 and the ambient. In accordance with the invention, a piezoelectric layer 64 with terminals 65 and 66 on the contacting faces thereof is positioned with one side in contact with the surface 61. A thermoelectric converter 67 is positioned with the "cold" side 68 thereof in contact with the piezoelectric layer 64 and with a cooling fin structure 69 and terminals 70 and 71 on the "hot" side 72 thereof. On the side of the passive substrate 63 that is opposite to the surface 62, a piezoelectric layer 73 with terminals 74 and 75 is placed. Thereover, a thermoelectric converter 76 is placed with the "cold" side 77 in contact with the piezoelectric layer 73. The "hot" side 78 of the thermoelectric cooler is in contact with a cooling fin structure 79 and has terminals 80 and 81.

The structure of FIG. 7 has the combined piezoelectric and thermoelectric converter elements on both the active 60 and passive 63 substrates so that the heat performance can be controlled in comparison. While the active 60 and passive 63 substrates are shown for mutual support at surface 62, they may be positioned separately and other structural support provided.

In a structure embodying the principle of FIG. 7, the difference in expansion of the active and passive substrate materials 60 and 63 provides piezoelectric signals for control of a single or plurality of thermoelectric coolers which in turn regulate the cooling to dynamically compensate for expansion differences and minimize stresses.

A particularly sensitive interconnection wiring for the structure of FIG. 7 is shown in FIG. 8 wherein in essence the active 60 and the passive 63 substrates heat signals are processed in the parallel branches of a differential amplifier type circuit with the amplifying elements 82, 83, 84 and 85 selected for their impedance matching capabilities with respect to the piezoelectric layer signals which in this circuit are NPN transistors connected as emitter followers.

In operation, as the active 60 and the passive 63 materials expand, a small signal, due to the slightly different temperature coefficients of expansion, will appear across the terminals 65 and 66 and 74 and 75 of the piezoelectric layers. The signals are an analog of the stress in each layer due to expansion. The signals are amplified in transistors 82 and 85 and used as inputs to the emitter follower pair of transistors 83 and 84. The differential amplifier circuit branches made up of transistor 83 with thermoelectric cooler 67 as a load and transistor 84 with thermoelectric cooler 76 as a load with the emitters connected in common to −V has the property that although the currents in the branches may differ, the total current will be a constant value. As a different amount of heat in one of materials 60 and 63 is sensed, the uneven current flow results in a substantially greater cooling through the thermoelectric cooler load on the heavier current carrying branch. The structure and circuit of FIGS. 7 and 8 thus maintains the two materials 60 and 63 in the same state of expansion during normal operation. During power on and power off, the feedback ensures that the two materials expand and contract in a manner which maintains minimal stress at the interfaces during the entire transient and normal fluctuations in heat dissipation from the active devices in material 60 is also compensated. The control achieved permits larger interfaces and hence greater integration density within a given interface stress tolerance value.

What has been described is an interface stress control for a material employing a piezoelectric signal resulting from expansion as a control for a thermoelectric cooler that regulates the temperature of the material.

Having thus described our invention, what we claim as new and desire to secure by letters patent is:

1. A temperature regulating structure for a heat radiating material comprising:
   a piezoelectric layer on a surface of said heat radiating material,
   a thermoelectric cooler on said piezoelectric layer, and, control means operable in response to a signal from said piezoelectric layer to alter the cooling function of said thermoelectric cooler.

2. The structure of claim 1 wherein said control means includes piezoelectric signal amplification employed in varying current supplied to said thermoelectric cooler.

3. Temperature regulating apparatus for a heat radiating material comprising in combination:
   a piezoelectric layer in contact with a heat radiating surface of said material,
   a thermoelectric cooler member having one side thereof in contact with said piezoelectric layer, and
   control means operable to alter current flow in said thermoelectric cooler in response to a signal from said piezoelectric layer.

4. The apparatus of claim 3 wherein said heat radiating material is a semiconductor integrated circuit.

5. The apparatus of claim 4 including a cooling fin structure in contact with the remaining side of said thermoelectric cooler member.

6. The apparatus of claim 5 wherein said control means is a series connection of said thermoelectric cooler member to an emitter follower NPN transistor, and with said piezoelectric layer output signal controlling said NPN transistor.

7. A temperature regulating assembly comprising in combination
   a planar active material member having heat producing capability radiating from a surface thereof,
   a first piezoelectric layer in contact with said heat radiating surface,
   a first thermoelectric cooler member having a hot and cold surfaces, said cold surface thereof being in contact with said piezoelectric layer,
   a planar passive material member,
   a second piezoelectric layer in contact with a surface of said planar passive material,
   a second thermoelectric cooler having hot and cold surfaces, said cold surface thereof being in contact with said second piezoelectric layer, and
   control means whereby currents supplied to both said first and said second thermoelectric cooler members responsive to respective signals from said first and second piezoelectric layers are operable to maintain predetermined relative temperature and stress conditions in both said active and said passive planar material members.

8. The assembly of claim 7 wherein said control means includes:
   a separate active material member control branch and a passive material member control branch, said branches being connected as a differential amplifier, and wherein, in said active material control branch, said first thermoelectric cooler member is connected in series with a first amplifier and with an output from said first piezoelectric layer being amplified and the amplified signal then controlling said first amplifier, and wherein in said passive material control branch, said second thermoelectric cooler member is connected in series with a second amplifier and with an output from said second piezoelectric layer being amplified and the amplified signal then controlling said second amplifier.

9. The assembly of claim 8 including first and second cooling fin structures, said first being in contact with said hot surface of said first thermoelectric cooler and said second being in contact with said hot surface of said second thermoelectric cooler.

10. The assembly of claim 9, wherein said amplifier in each said branch and said piezoelectric signal amplification in each said branch is an NPN transistor.

11. Temperature and stress control of a member comprising:
    piezoelectric signal generating expansion sensing means approximately covering and in contact with a surface of said member,
    thermoelectric cooling means approximately covering and in thermoinfluencing contact with said surface of said member, and
    electrical current control means for supplying variable current to said thermoelectric cooling means responsive to said piezoelectric signal means.

12. The control of claim 11 wherein said electrical current control means supplies variable current operable to maintain relative temperature and stress between an active member and a passive member structure, each with a piezoelectric sensing means and thermoelectric cooling means combination.

* * * * *